(12) United States Patent
Braun et al.

(10) Patent No.: US 9,338,827 B2
(45) Date of Patent: May 10, 2016

(54) HEATING DEVICE FOR INSTALLATION IN A SWITCHGEAR CABINET

(75) Inventors: Ruediger Braun, Dietzhoelztal (DE); Friedhelm Loh, Dietzhoelztal (DE)

(73) Assignee: Rittal GmbH & Co. KG, Herborn (DE)

( * ) Notice: Subject to any disclaimer, the term of this patent is extended or adjusted under 35 U.S.C. 154(b) by 703 days.

(21) Appl. No.: 13/261,447

(22) PCT Filed: Mar. 4, 2011

(86) PCT No.: PCT/EP2011/053260
§ 371 (c)(1),
(2), (4) Date: Dec. 10, 2012

(87) PCT Pub. No.: WO2011/120759
PCT Pub. Date: Oct. 6, 2011

(65) Prior Publication Data
US 2013/0087550 A1    Apr. 11, 2013

(30) Foreign Application Priority Data

Mar. 29, 2010 (DE) .......................... 10 2010 016 177

(51) Int. Cl.
| | |
|---|---|
| H05K 5/02 | (2006.01) |
| H05K 7/20 | (2006.01) |
| H05B 3/06 | (2006.01) |
| H05B 3/52 | (2006.01) |
| H02B 1/26 | (2006.01) |
| H02B 1/56 | (2006.01) |
| F24H 3/12 | (2006.01) |
| H05B 3/50 | (2006.01) |

(52) U.S. Cl.
CPC ................ *H05B 3/06* (2013.01); *H02B 1/565* (2013.01); *H02B 1/26* (2013.01); *H05B 3/50* (2013.01)

(58) Field of Classification Search
None
See application file for complete search history.

(56) References Cited

U.S. PATENT DOCUMENTS

| | | | | |
|---|---|---|---|---|
| 3,217,793 A | * | 11/1965 | Coe .............................. | 165/80.3 |
| 4,352,008 A | * | 9/1982 | Hofer et al. ................... | 219/540 |
| 7,335,855 B2 | * | 2/2008 | von der Luhe et al. ....... | 219/201 |
| 7,664,379 B2 | | 2/2010 | Eisenhauer | |

(Continued)

FOREIGN PATENT DOCUMENTS

| | | |
|---|---|---|
| DE | 92 17 778 U1 | 11/1996 |
| DE | 10 2004 057 530 A1 | 6/2006 |

(Continued)

OTHER PUBLICATIONS

"Rittal Instruction Manual, Enclosure Heater," Rittal GmbH & Co. KG, Jun. 2014.*

(Continued)

*Primary Examiner* — Joseph M Pelham
(74) *Attorney, Agent, or Firm* — Marshall & Melhorn, LLC

(57) ABSTRACT

The invention relates to a heating device for installation in a switchgear cabinet, having a support and a heating body, wherein the support replaceably accommodates the heating body in a holder. Simple and secure mounting of the heating body on the support is achieved in that the holder has a contact surface to which limiting elements are attached, in that the limiting elements immobilize the heating body in a form-fitting manner transversely to the contact surface plane, and in that one or a plurality of locking elements are provided in the region of the holder, which immobilize the heating body in a form-fitting manner perpendicularly to the contact surface.

7 Claims, 5 Drawing Sheets

(56) References Cited

U.S. PATENT DOCUMENTS

| | | | |
|---|---|---|---|
| 7,725,011 B2 * | 5/2010 | Boussier | 392/407 |
| 2005/0006053 A1 | 1/2005 | Apfelbacher et al. | |

FOREIGN PATENT DOCUMENTS

| | | | | |
|---|---|---|---|---|
| DE | 20 2005 020 765 U1 | 7/2006 | | |
| EP | 0 002 660 A1 | 7/1979 | | |
| EP | 1 433 233 B1 | 7/2005 | | |
| GB | 2 140 260 A | 11/1984 | | |
| GB | 2140260 A | * 11/1984 | ............... | H05B 3/00 |

OTHER PUBLICATIONS

Rittal GmbH & Co. KG; Rittal Handbook; Heaters and Enclosure Heaters; pp. 654-655; Rittal Catalogue 31/System climate control; Herborn, Germany.

Rittal GmbH & Co. KG; Supplement to Rittal Handbook; Operating Housings; p. 32; Rittal Innovations 2009/Industrial Enclosures; Herborn, Germany.

Rittal GmbH & Co. KG; Supplement to Rittal Handbook 32; Enclosure Heaters-Features; p. 82; Rittal Innovations 2009/System Climate Control; Herborn, Germany.

Rittal GmbH & Co. KG; Supplement to Rittal Handbook 32; Technical Details; p. 189; Rittal Innovations 2009; Herborn, Germany.

* cited by examiner

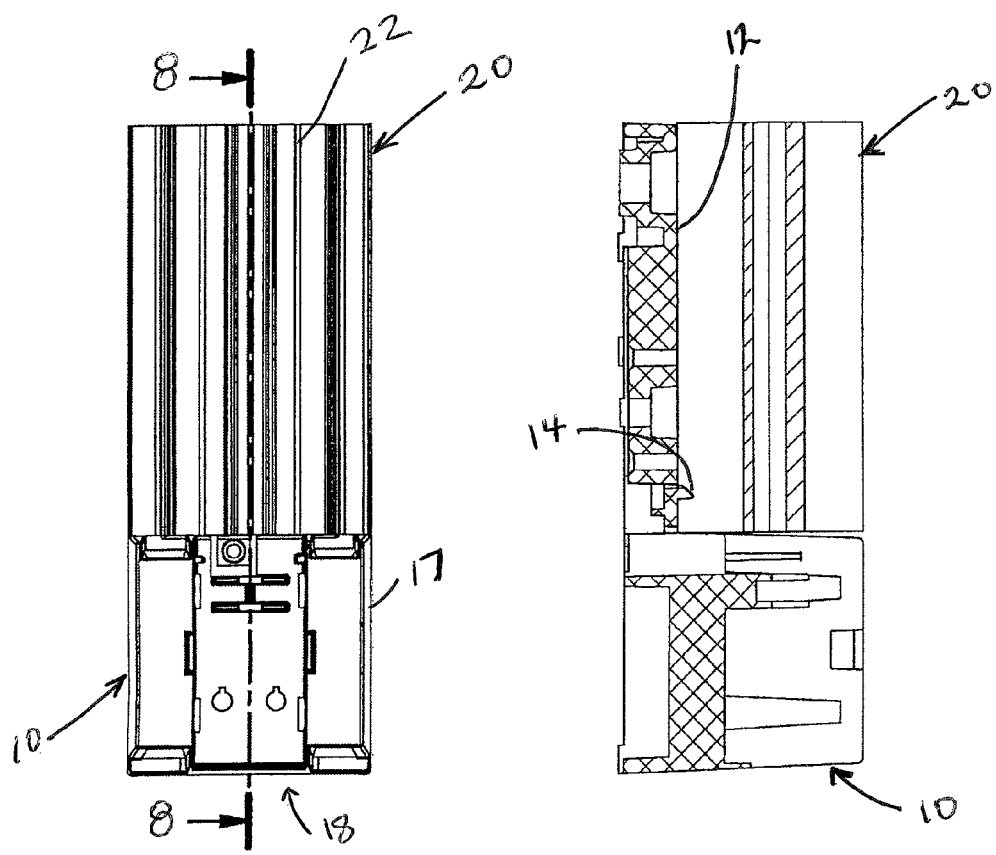
FIG. 7
FIG. 8
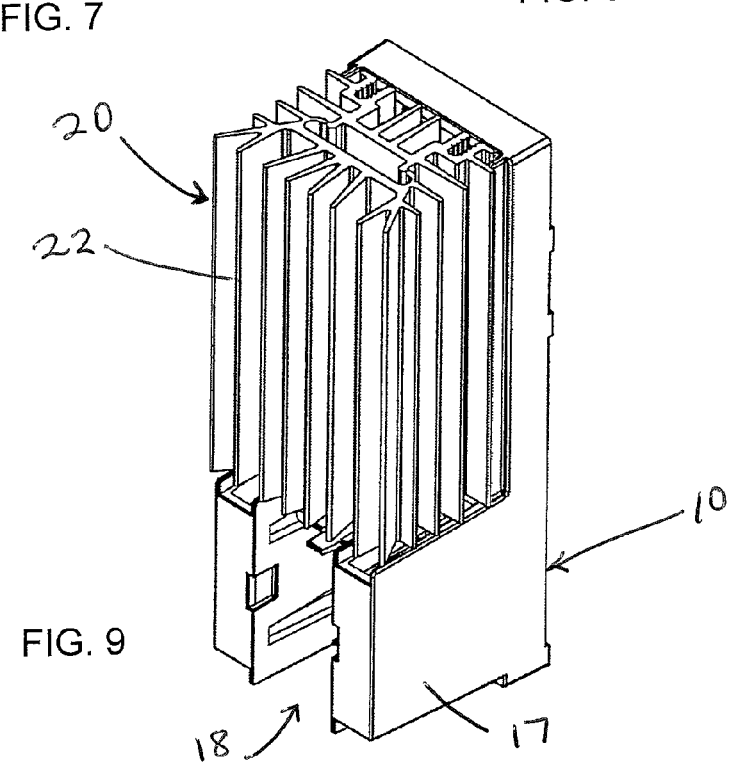
FIG. 9

HEATING DEVICE FOR INSTALLATION IN A SWITCHGEAR CABINET

BACKGROUND OF THE INVENTION

The invention relates to a heating device for installation in a switchgear cabinet, having a support and a heating body, wherein the support replaceably accommodates the heating body in a holder, according to the preamble part of claim 1.

Heating devices of this type are in particular used when switchgear cabinets are arranged in outdoor areas. Depending on weather conditions, it may be needed for reliable operation of the electronics accommodated in the switchgear cabinet to raise the thermal level by utilizing heating devices. Another application results when the risk of formation of condensate in the interior of the switchgear cabinet is given. The heating device is fixed in the interior of the switchgear cabinet such that the available heating power may be used accordingly.

Various heating elements having the respectively needed power are available for different applications. Commonly, the heating devices are fixed to top head rails by means of mounting brackets. The mounting brackets are, on the one hand, connected with heating bodies and comprise screw bores to screw them to a top head rail or a chassis mounted within the switchgear cabinet.

Heating devices of this type are known from company brochure "Rittal-Handbuch 31, Seiten 654 and 655".

A heating device according to the preamble part of claim 1 is known from US 2005/0006053 A1. A support replaceably receives a heating body within a holder, wherein limiting elements are arranged spaced apart from another such that they form guiding rails for the heating body. When the heating body is completely inserted into the guiding rails, it is locked in that position by means of snap-lock elements. The snap-lock elements are arranged in transverse direction of the limiting elements, so that they define a final mounting position in which the heating body is firmly retained.

EP 0 002 660 A1 discloses a heating device of a switchgear cabinet consisting of a base plate which is U-shaped in cross-section and which accommodates a heating body together with a thermostat. The base plate is provided with a continuous fixing double-web into which a screwing groove is formed so that self-tapping fastening screws may be screwed at any location therein.

A switchgear cabinet heater is described in DE 92 17 778 U1, wherein a heating body is screwed onto a thermostat housing.

Finally, also GB 2 140 260 A shows a heating body which can be screwed to a support.

SUMMARY OF THE INVENTION

It is the object of the invention to create a heating device of the type mentioned in the introductory, which may be quickly and easily installed in the interior of a switchgear cabinet and which ensures reliable fixing of the heating body.

This object is solved by a heating device according to claim 1. The holder has a contact surface which is arranged upright between limiting elements spaced apart from another, wherein one or a plurality of snap-lock elements are provided in the region of the holder which immobilize the heating body within the holder such that the limiting elements immobilize the heating body in a form-fitting manner transversely to the contact surface plane. The limiting elements are discontinuous in an end region of the holder to form the snap-lock elements. In this way, a geometry of the support results which is open in longitudinal direction of the heating bodies and allows utilization of heating bodies of varying length.

This heating device can be mounted in the interior of the switchgear cabinet such that firstly the support is coupled to a desired fixing site, for example a top head rail. Subsequently, the heating element can be inserted into the holder of the support and snapped into the snap-lock elements. Thus, tool-less assembly is possible. In a locked state, the heating device is supported on the contact surface on the one hand and by the limiting elements on the other hand. Thereby, the heating body is reliably secured against translation transverse to the contact surface plane in a form-fitting manner. Reliable fixing of the heating element can be effected by this snap-lock element.

Since it is provided to arrange a support in the region of the holder which comprises a guiding slope inclined at an angle with respect to the contact surface, guiding the heating body into the holder during assembly, the heating body may be obliquely inserted into the holder during assembly, the guiding slope guiding the insert motion. Subsequently, the heating body is pivoted into the holder while locking with the snap-lock element. That assembly is unique and may be performed in a simple manner.

A possible variant of the invention is such that the snap-lock elements immobilize the heating body perpendicularly to the contact surface in a form-fitting manner. Further, it is provided that the holder comprises a protrusion engaging a recess of the heating body. A variant may be that the snap-lock element engages a recess of the heating body.

According to a preferred embodiment of the invention, it may be provided that the holder comprises an interface for heating bodies of varying length which are embodied as profiled sections. Thus, the user is provided with a kit, wherein heating bodies having different heating power may be selectively attached to a holder. The heating bodies may be cut to length as profile sections from a semi-finished product at low cost.

The limiting elements may in particular be embodied as parallel webs, the heating body abutting thereto via mounting bars formed thereon. By this measure, the number of different parts may be further reduced.

According to a preferred variant of the invention, it may be provided that the holder comprises a protrusion engaging a recess of the heating body or that the snap-lock element engages a recess of the heating body.

In a heating device according to the invention, the snap-lock elements may be arranged such that they are locked with the mounting bar which is integrally formed with the heating body and is embodied as a heat exchanger fin. On the one hand, the number of parts is reduced. On the other hand, the heating body is configured efficiency-optimized, since heating energy can also be dissipated via the mounting bars.

A conceivable variant of the invention is such that two assembled bodies are attached to the holder, which are spaced apart from another and delimit a cable duct, that the cable duct provides access to an electrical terminal of the heating body and that one or both assembled bodies enclose an air-duct, which is spatially connected with an air-guiding region of the heating body. On the one hand, the two assembled bodies serve to shield the electrical terminal of the heating body. On the other hand, the assembled bodies provide the air duct to allow target-oriented air flow to the air guiding region of the heating body.

The cable duct may be closed by means of a removable cover which is snap-locked to the support. The cover being removed, the electrical terminal of the heating element may easily be accessed for installation purposes.

A particularly preferred variant of the invention is such that the heating body is embodied as extruded profile with integrally molded heat exchanger fin and that the heating body comprises a base part having a heating element receptacle into which the heating element is inserted. By this measure, a particularly simple and cost-effective construction for the heating body to be produced will result. In particular, the heating body may be fabricated from an extruded aluminum profile which guarantees good heat exchange characteristics. The heating element may be pressed into the heating element receptacle to allow a good heat transfer between the heating body and the heating element.

BRIEF DESCRIPTION OF THE DRAWINGS

The invention will be explained in detail below with the aid of an exemplary embodiment illustrated in the drawings. It is shown in:

FIG. 7 is a front view of an assembly of the support of FIG. 3 with the heating body of FIGS. 4 and 5;
FIG. 8 is a sectional view taken through the line 8-8 of FIG. 7;
and
FIG. 9 is a perspective front view of the assembly of FIG. 7.

DETAILED DESCRIPTION OF THE INVENTION

Figure 1:
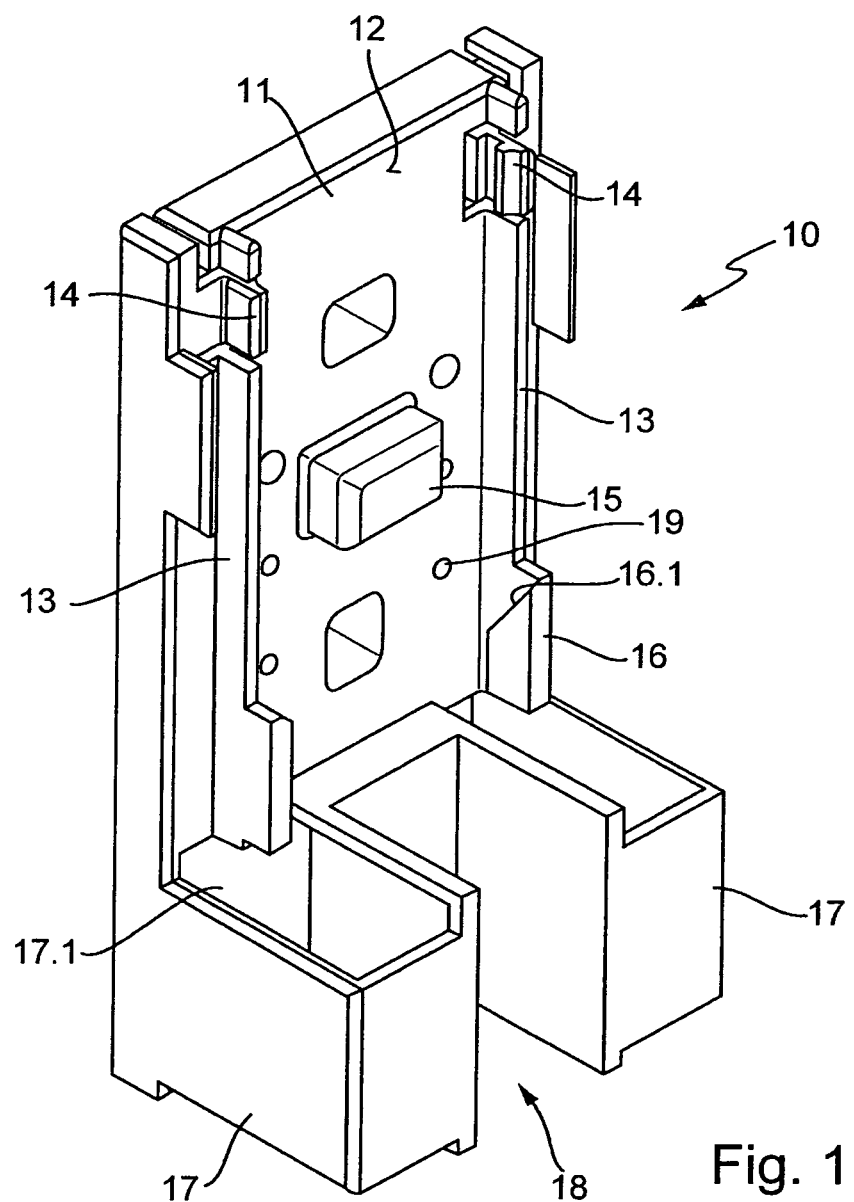
FIG. 1 a support in a perspective front view.

FIG. 1 shows a support 10 which is embodied as an injection-molded part made of plastic. It comprises a holder 11 which possesses a contact surface 12. In the center of contact surface 12, a protrusion 15 which is rectangular in cross-section rises above the contact surface plane. Bores 19, are machined into contact surface 12 which give access to the rear face of support 10. Fixing screws may be guided through bores 19 serving for coupling to a support in the interior of the switchgear cabinet. For example, a top head rail or a mounting chassis may be used as support.

Contact surface 12 is bordered on both sides by two limiting elements 13. Limiting elements 13 are embodied as rib-shaped webs which are parallel spaced apart. Limiting elements 33 are discontinuous in the end region of contact surface 12 such that snap-lock elements 14 are formed. Snap-lock elements 14 are resiliently integrally coupled to support 10. They comprise an inclined deflecting slope which merges into a steep locking face arranged parallel to contact face 12.

Supports 16 are connected to limiting elements 13 facing away from snap-lock elements 14. Supports 16 are embodied such that they protrude beyond limiting elements 13 in direction of the plane of contact surface 12. In this way, an undercut is formed. The undercut merges into a guidance slope 16.1 inclined at an angle <90° with respect to the surface contact plane. Two assembly bodies 17 are formed to support 10 at the end of contact surface 12 facing away from snap-lock elements 14. Assembly bodies 17 are spaced apart from another such that they laterally delimit a cable duct 18. Each of the assembly bodies 17 encloses an air duct 17.1. On the one hand, air duct 17.1 is open in a longitudinal direction of contact surface 12. On the other hand, air duct 17.1 is open towards the rear side of support 10 as may be clearly recognized in FIG. 1. Furthermore, air duct 17.1 is also open at the bottom face at the bottom of FIG. 1.

Figure 2:
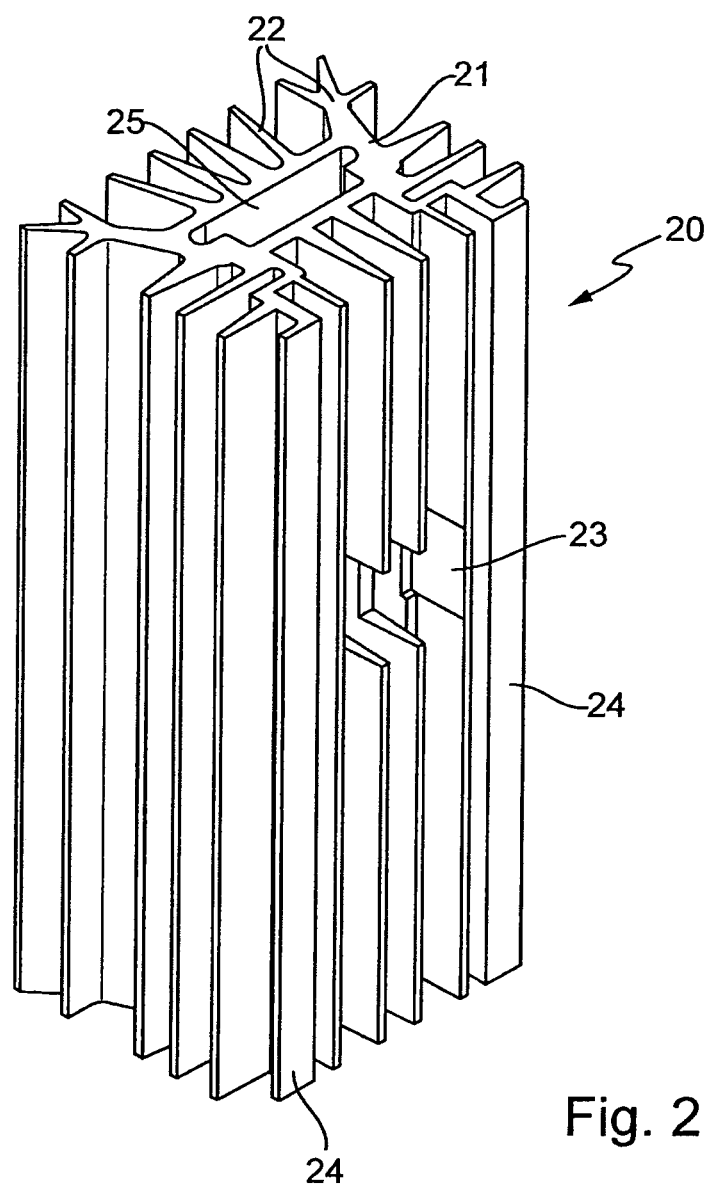
FIG. 2 a heating body in a perspective side view.

FIG. 2 illustrates a heating body 20 which can be mounted to support 10. The heating body 20 is embodied as an extruded aluminum profiled section. It comprises a base part 21, to which heat exchanger fins 22 are integrally formed. Base part 21 is penetrated by a heating element receptacle 25 which is a continuous recess in a longitudinal direction of heating body 20. At the bottom side thereof, heat exchanger fins 22 of heating body 20 are embodied such that they form laterally protruding mounting bars 24. A recess 23 in form of a milling groove is machined into heating body 20 between mounting bars 24. Recess 23 is dimensioned such that protrusion 15 of support 10 can be accommodated therein. An electrical heating element, not illustrated in FIG. 2, can be pressed into heating element receptacle 25. The press process is configured such that heat transfer faces of the heating element are in direct contact with limiting faces of the heating element receptacle 25, so that a good heat transfer is ensured.

For mounting heating element 20, mounting bars 24 are brought to the guiding slopes 16.1 of support 16. The longitudinal center axis of heating body 20 is at an angle of <90° with respect to the plane of contact surface 12.

Heating body 20 can be inserted into holder 11 such that mounting bars 24 slide along guiding slopes 16.1 until they reach the region of undercut of supports 16. Then, the heating body 20 may be folded down until its center longitudinal axis is parallel to contact surface 12. When folding down, protrusion 15 engages recess 23. Simultaneously, snap-lock elements 14 reach mounting bars 24 with their deflecting slopes. Resiliently suspended snap-lock elements 14 are then deviated in opposite direction, until mounting bars 24 have passed the deviating slopes. Snap-lock elements 14 then snap inwardly, wherein snap-locked faces of snap-lock elements 14 catch behind mounting bars 24. Heating body 20 is thus attached to the limiting elements 13 in transverse direction in a form-fitting manner. In longitudinal direction of the limiting elements 13, heating body 20 is held at protrusion 15 in a form-fitting manner. Offsetting the heating body 20 is prevented in a direction perpendicular to contact surface 12 by snap-lock elements 14 and undercut of supports 16. In this way, heating body 20 is reliably secured to support 10.

The electrical terminal of the heating element is, in an assembled state of heating body 20, held in the region of cable duct 18. Thus, the electrical connection can be made in a simple way. Finally, cable duct 18 can be covered by a cover (which is not illustrated).

During operation, the heating element transfers its heating power to heating body 20. That heating power is dissipated at heat exchanger fins 22 mainly by convection processes into the interior of the switchgear cabinet. Convection is supported by the chimney effect of air ducts 17.1.

Figure 3:
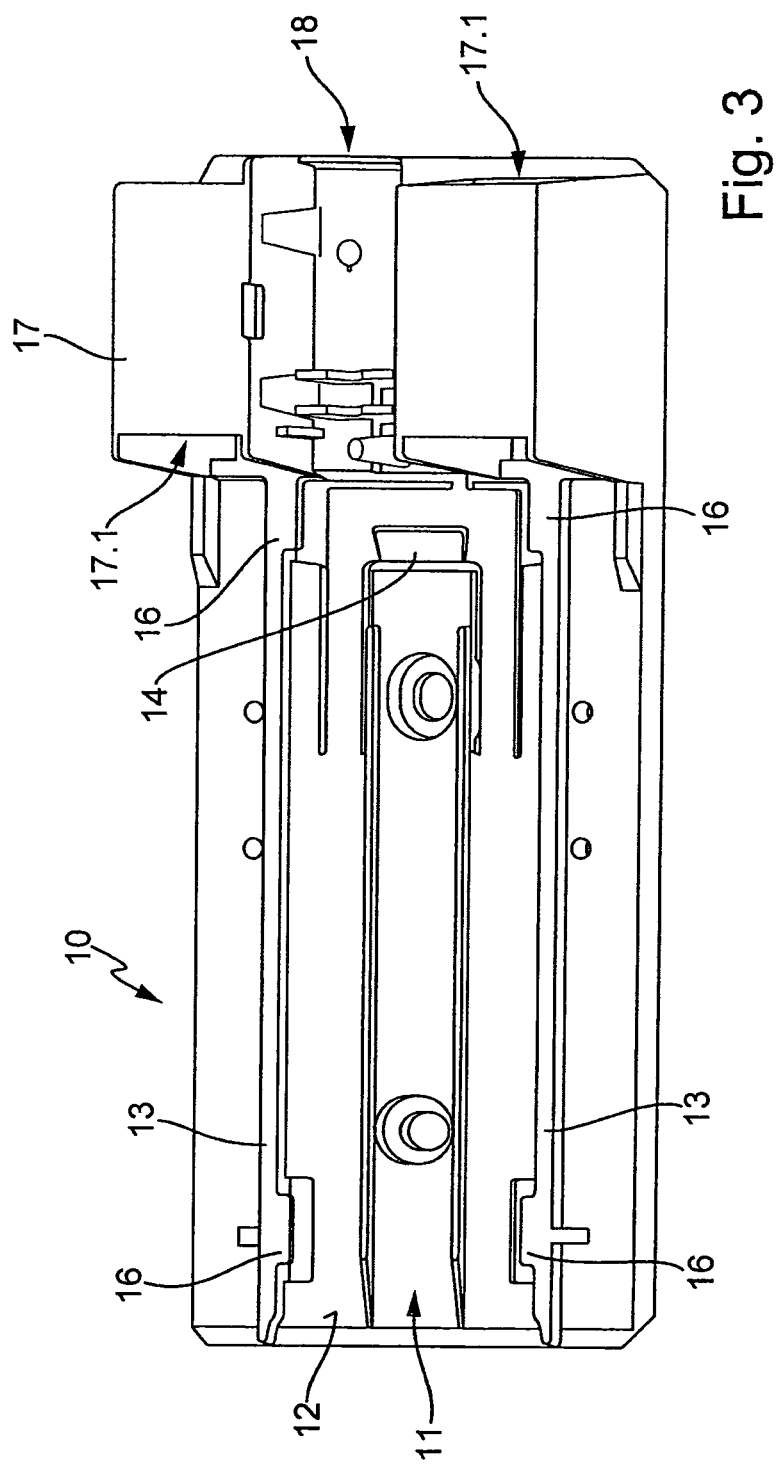
FIG. 3 a further variant of embodiment of a support in a perspective front view.

FIG. 3 shows a further variant of embodiment of support 10. Support 10 corresponds essentially to the embodiment features of support 10 according to FIG. 1. In particular, it comprises a holder 11 having a contact surface 12 which is laterally bordered by two web-like limiting elements 13. Furthermore, support 10 possesses two assembled bodies 17 respectively enclosing an air duct 17.1 and laterally merging to a cable duct 18. Also in so far, support 10 of FIG. 3 is similar to support 10 of FIG. 1 so that reference may be made to the relevant explanations above. For support 10 according to FIG. 3, two supports in form of protrusions are formed to each limiting element 13. Supports 16 of both limiting elements 13 are opposite by pairs and thus form sliding guides for heating body 20. In the region of the two assembled bodies 17, a tongue-shaped spring element is exposed from contact surface 12 which carries a snap-lock element 14.

Figure 4:
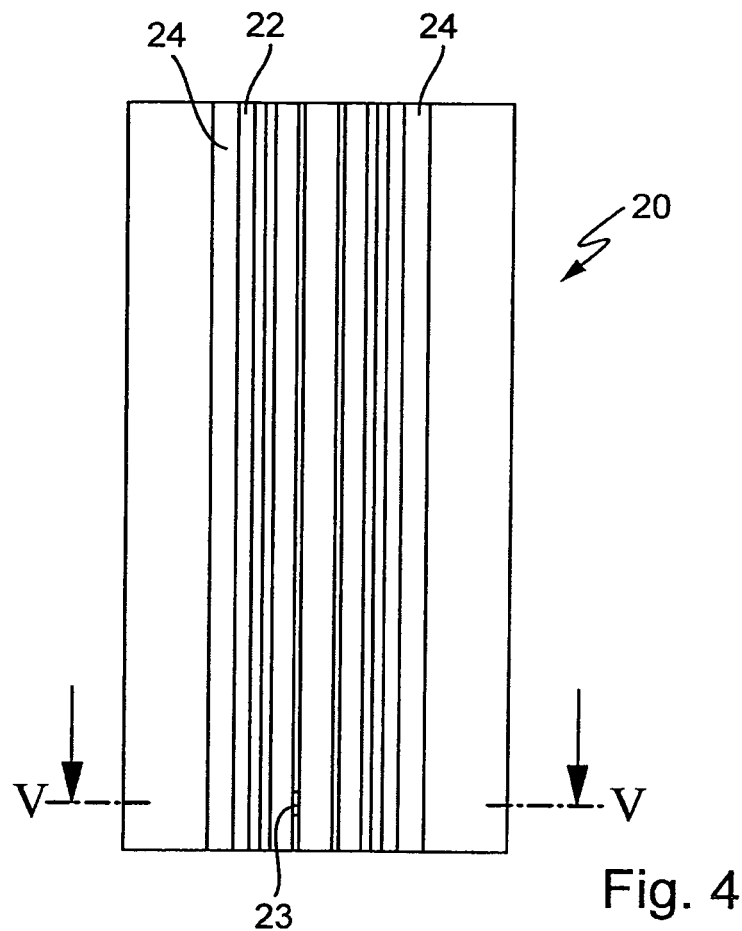
FIGS. 4 and 5 a heating body in various views.
Figure 5:
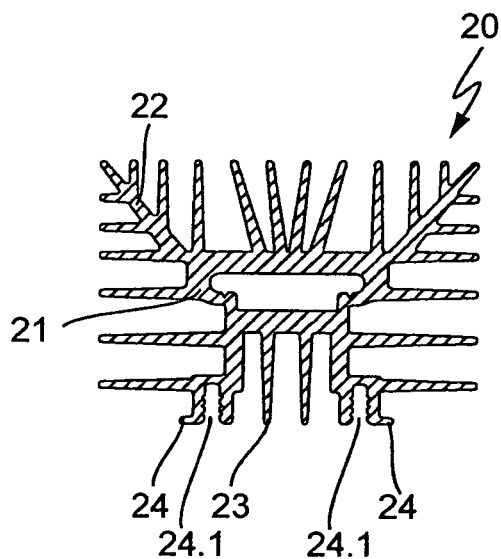

FIGS. 4 and 5 show a variant of embodiment of a heating body 20 which is configured for mounting at support 10. Heating body 20 according to FIGS. 4 and 5 essentially corresponds to the heating body of FIG. 2.

Different from the heating body of FIG. 2, heating body 20 of FIGS. 4 and 5 possesses a recess 23 which is positioned in the region of an end side of heating body 20. Recess 23 serves as a locking receptacle for snap-lock element 14 of support 10. For mounting heating body 20, it is put 17 with its mounting bars 24 on that end of contact surface 12 facing away from the assembled bodies. Now, heating body 20 can be moved on contact surface 12, while mounting bars 24 pass below supports 16. Thus, supports 16 prevent lifting of heating body 20 perpendicular to contact surface 12. While inserting heating body 20, front end of heating body 20 comprising recess 30 leads snap-lock element 14. The tongue-shaped tap of snap-lock element 14 is deviated downwardly. Deviating is supported by an approach slope which is oblique with respect to contact surface 12. As soon as recess 23 reaches the region of snap-lock element 14, snap-lock element 14 locks into recess 23 and immobilizes heating body 20 undisplaceably in axial direction. Consequently, heating body 20 is reliably attached to support 10. As may be recognized in FIG. 5, recess 23 is embodied as a milled groove.

Figure 6:
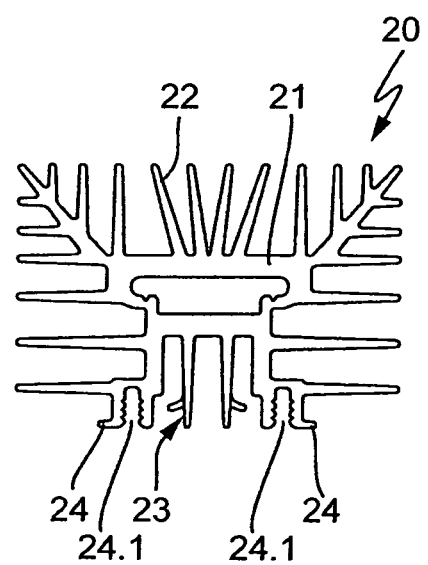
FIG. 6 a further variant of embodiment of a heating body in a front view.

FIG. 6 illustrates a further variant of embodiment of a heating body. In place of the milled groove, recess 23 is produced such that heat exchanger fins 22 are finally sawed into recess 23b and are bent laterally. Two parallel cuts are made for each heat exchanger fin 22, the cuts being spaced apart from another such that the width of recess 23 indicated in FIG. 4 results.

As may be further recognized in FIGS. 5 and 6, each heating body 20 comprises two screw channels 24.1 extending in longitudinal direction. If needed, heating body 20 can additionally be screwed to support 10.

The invention claimed is:

1. A device for transferring heat from a heating element to the interior of a switchgear cabinet, having a support and a heatable body, wherein the support replaceably accommodates the heatable body in a holder comprising a contact surface which defines a contact surface plane and is arranged upright between limiting elements spaced apart from and parallel to one another, wherein the holder includes one or a plurality of snap-lock elements that immobilize the heatable body within the holder such that the limiting elements immobilize the heatable body in a form-fitting manner transversely to the contact surface plane, wherein
  the limiting elements are discontinuous in an end region of the contact surface to form the snap-lock elements,
  the holder comprises a guiding slope inclined at an angle <90° with respect to the contact surface that is configured to guide the heatable body into the holder during assembly, and
  the heatable body comprises a recess. and the holder comprises a protrusion engaging the recess of the heatable body or the snap-lock element engages the recess of the heatable body.

2. The device of claim 1, wherein the holder comprises an interface for heating bodies of varying length.

3. The device of claim 1; wherein the limiting elements are embodied as parallel webs, the heatable body abutting thereto via mounting bars formed thereon.

4. The device of claim 1 wherein the snap-lock elements are arranged such that they are locked with a mounting bar which is integrally formed with the heatable body and is embodied as a heat exchanger fin.

5. The device of claim 1 wherein two assembled bodies are attached to the holder which are spaced apart from one another and delimit a cable duct, the cable duct provides access to an electrical terminal of the heatable body, and one or both assembled bodies enclose an air duct which is spatially connected with an air guiding region of the heatable body.

6. The device of claim 5 wherein the cable duct can be closed by means of a removable cover which is snap-locked to the support.

7. The device of claim 1 wherein the heatable body is embodied as extruded profile with integrally formed heat exchanger fins and the heatable body comprises a base part having a heating element receptacle configured to receive the heating element.

* * * * *